United States Patent
Matsumoto

(10) Patent No.: US 7,268,904 B2
(45) Date of Patent: Sep. 11, 2007

(54) PRINT ORDER RECORDING SYSTEM THAT PROVIDES NOTIFICATION IF A REQUESTED IMAGE IS ABSENT

(75) Inventor: Kentaro Matsumoto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 841 days.

(21) Appl. No.: 10/153,293

(22) Filed: May 21, 2002

(65) Prior Publication Data

US 2002/0176109 A1    Nov. 28, 2002

(30) Foreign Application Priority Data

May 24, 2001    (JP)    ............................. 2001-155309

(51) Int. Cl.
*G06K 15/00* (2006.01)
*H04N 1/23* (2006.01)
(52) U.S. Cl. ...................... 358/1.15; 358/302
(58) Field of Classification Search .............. 358/296, 358/448, 1.15, 1.1, 1.9, 1.12, 302
See application file for complete search history.

(56) References Cited

U.S. PATENT DOCUMENTS

| | | | |
|---|---|---|---|
| 4,908,853 A | 3/1990 | Matsumoto | ................. 379/355 |
| 5,280,517 A | 1/1994 | Matsumoto | ................. 379/70 |
| 6,556,713 B2 | 4/2003 | Kobayashi et al. | ......... 382/224 |
| 6,573,927 B2* | 6/2003 | Parulski et al. | ............... 348/32 |
| 6,912,060 B1* | 6/2005 | Luciano et al. | ............ 358/1.15 |
| 6,982,800 B1* | 1/2006 | Cavill et al. | ............... 358/1.15 |
| 6,985,248 B2* | 1/2006 | Parulski et al. | ............ 358/1.16 |
| 2001/0022913 A1* | 9/2001 | Ohmura | ....................... 400/76 |
| 2001/0041056 A1* | 11/2001 | Tanaka et al. | ................ 386/95 |
| 2002/0105658 A1* | 8/2002 | Jackson et al. | ............. 358/1.2 |
| 2002/0126160 A1* | 9/2002 | Miyata et al. | .............. 345/838 |
| 2003/0131019 A1 | 7/2003 | Kobayashi et al. | ...... 707/104.1 |

FOREIGN PATENT DOCUMENTS

JP    10-084473    3/1998

OTHER PUBLICATIONS

DPOF, Canon Inc.- Eastman Kodak Co.- Fuji Photo Film Co.- Matsushita Electric Industrial Co., Jul. 2000, pp. 1-7.*

* cited by examiner

*Primary Examiner*—Gabriel Garcia
(74) *Attorney, Agent, or Firm*—Fitzpatrick, Cella, Harper & Scinto

(57) ABSTRACT

Reduced image data of images recorded in a memory card of a digital camera is transmitted from the digital camera to a portable phone. In the portable phone, while viewing the photographs one by one, a print order instruction operation is performed on the desired images. The print order information is transmitted from the portable phone to the digital camera, and the information is recorded as a print order file into the memory card in the digital camera.

17 Claims, 12 Drawing Sheets

FIG. 7

```
[HDR]
GEN REV = 01.00
GEN CRT = "OANO  IX  DIGITAL 2001"-01.00
GEN DTM = 2001:05:09:16:08:06
USR NAM =        TARO
USR TEL = 09012345678

[JOB]
PRT PID = 001
PRT TYP = STD
PRT QTY = 001
IMG FMT = EXIF2-J
<IMG SRC = "../DCIM/2260ANON/IMG_2617.JPG">
CFG DSC = "2001/05/05"-ATR DTM
```
— 901

```
[JOB]
PRT PID = 002
PRT TYP = STD
PRT QTY = 001
IMG FMT = EXIF2-J
<IMG SRC = "../DCIM/2260ANON/IMG_2618.JPG">
CFG DSC = "2001/05/05"-ATR DTM
```
— 902

PRINT ORDER RECORDING SYSTEM THAT PROVIDES NOTIFICATION IF A REQUESTED IMAGE IS ABSENT

BACKGROUND OF THE INVENTION

1. Field of the Invention

The present invention relates to a system for recording a print order file in which information such as filenames of images to be printed and the number of copies thereof is written.

2. Description of the Related Art

"Print order" refers to information including the number of prints of images desired to be printed, a print format, the presence or absence of date information, etc.

A user confirms the contents of images within a removable medium by using a digital camera with an image display function or by using a printer. When the user wants to print an image, print order information is recorded as a print order file by operating a switch, etc. Furthermore, the print order information includes the name of the device used, the date of the print order, the name of the person who made the print order, the telephone number, etc.

As a print order file in which the print order is written, DPOF (Digital Print Order Format) is known. DPOF is a text file format and is formed of one header section and one or more job sections. In the header section, information common to the print order (the name of the device, the date, the name of the person, the telephone number, etc.) is written. A job section exists for each image to be printed. In each job section, the path within the removable medium, the format of the image, the number of copies to be printed, a character string to be written as additional information, etc., are written. In the DPOF, this print order file is specified so as to be stored under the filename of AUTPRINT.MRK in the MISC directory in the DCIM directory in the root directory of the removable medium, that is: \\DCIM\MISC\AUTPRINT.MRK.

By using the print order file, it has been possible to easily print and make copies of desired image data simply by bringing a removable medium in which the image data and the print order file are recorded to a print shop. Furthermore, in the case of a printer with a print order function, it is possible to print any desired number of the desired images simply by inserting the removable medium into the printer and by performing DPOF printing.

In the manner described above, the print order is intended for images within the removable medium, and is created in the device into which this removable medium is inserted, that is, a digital camera or a printer with a display function.

However, printing a plurality of images corresponds to printing additional copies of a photograph. Thus, there is a demand for people who desire an additional copy to select a desired photograph while viewing the photographs. When this print order is made with one digital camera, the number of persons who can perform the operation simultaneously is limited to one, and the above-described demand cannot be satisfied.

A method for selecting desired image data from the image data stored in another device is disclosed in Japanese Unexamined Patent Application Publication No. 10-84473. In this method, image data of a reduced image, which is formed by reducing an original image, recorded at the transmission side, is transmitted to the receiving side, a list of reduced images received by the receiving side is displayed, and the image data of the original image corresponding to one or more reduced images, selected from within the list at the receiving side, is transmitted from the transmission side to the receiving side. This reference, however, does not disclose the creation of a print order at the device in which the original image data is stored.

SUMMARY OF THE INVENTION

The present invention improves the ease of operation for inputting print order information.

Further features and advantages of the present invention will become apparent from the following description of the preferred embodiments with reference to the attached drawings.

To achieve these and other advantages and in accordance with the purpose of the present invention, as embodied and broadly described, the present invention provides a print order recording apparatus including a communication section for communicating with a communication device, and a recording section for recording a print order file in a removable medium based on print order information received from the communication device, wherein the print order information is information that at least specifies one or more images to be printed.

In another aspect, the present invention provides a print order recording method including the steps of communicating with a communication device, and recording a print order file in a removable medium based on print order information received from the communication device, wherein the print order information is information that at least specifies one or more images to be printed. In yet another aspect, the present invention provides a computer usable medium embedding a print order recording program which contains program code configured to cause a print order recording apparatus to perform the above method steps.

BRIEF DESCRIPTION OF THE DRAWINGS

FIG. 7 shows a print order file according to the first embodiment of the present invention.

DETAILED DESCRIPTION OF THE PREFERRED EMBODIMENTS

Embodiments of the present invention enable a print order to be inputted in a device other than a recording apparatus which records print order information in a removable medium. In the description below, embodiments are disclosed in which an original image storage device (also referred to as a print order recording apparatus) which records a print order is a digital camera 400, and a communication device which specifies a print image is a portable phone (mobile phone) 401. However, a printer or a PDA (Personal Digital Assistant) having a storing function can also be used as the original image storage device for recording a print order. Furthermore, an image processing device such as a digital camera and a PDA can be used as a communication device for specifying a print image.

In a first embodiment described below, when performing a print order information creation process, a session from a portable phone (communication device) to a digital camera (print order recording apparatus) is established. Thereafter, reduced image data of images recorded in the digital camera is received sequentially, and while viewing the images one by one, print order instruction operations are performed on the desired images.

As will be described later, the print order information is transmitted to the digital camera, and stored temporarily in a memory such as a RAM 107 within the digital camera 400. When the print order operation is completed, the print order is recorded as a print order file in a removable medium such as a memory card 112.

Figure 1:
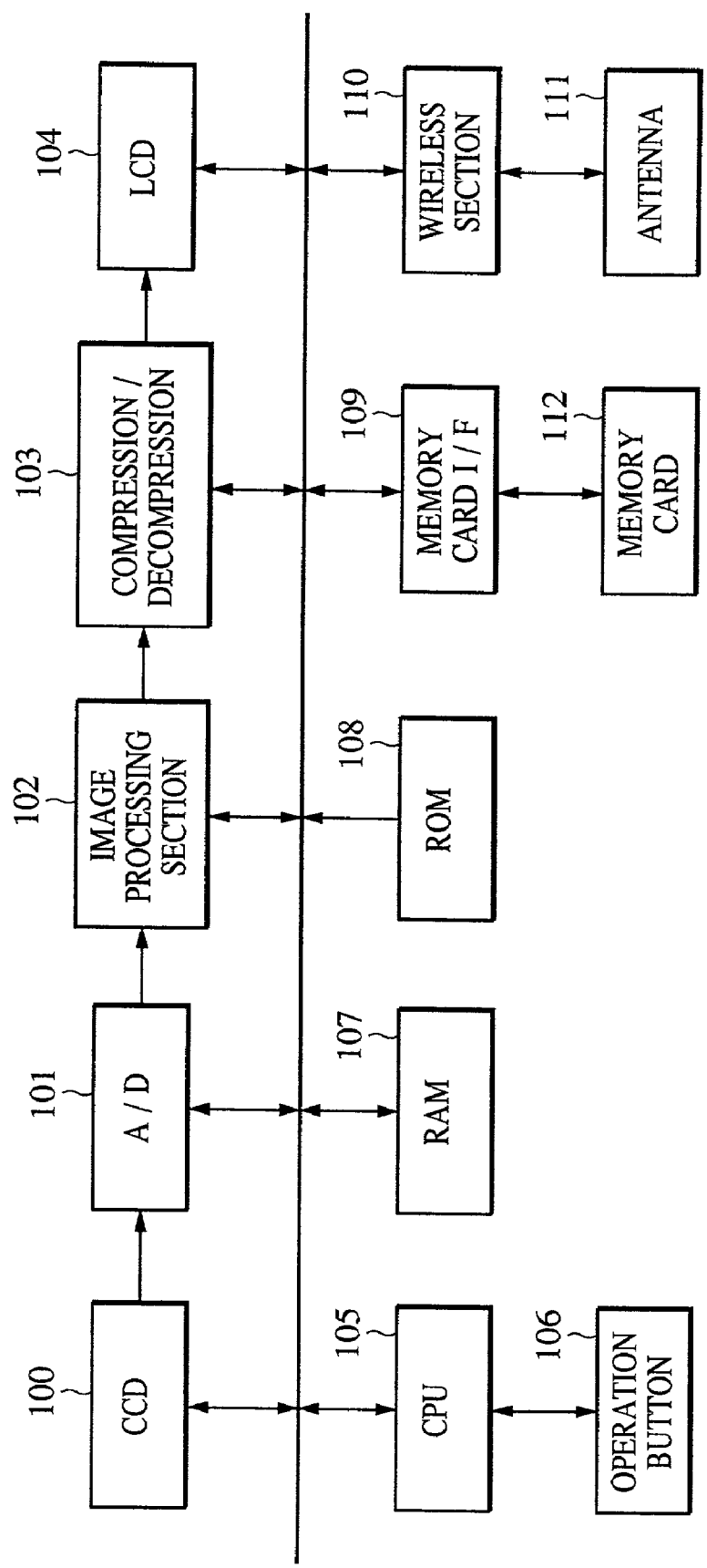
FIG. 1 shows the hardware configuration of a digital camera used in a print order recording system according to embodiments of the present invention.

Specific embodiments are now described with reference to the drawings. FIG. 1 is a block diagram showing the hardware configuration of the digital camera 400 which is one component of the print order recording system. The digital camera includes an image-capturing element such as a CCD 100, an A/D conversion section 101, an image processing section 102, a compression/decompression section 103, a display such as a liquid-crystal display (LCD) 104, a CPU (computer) 105, operation buttons 106, a RAM 107, a ROM 108, a memory card interface 109, a wireless section 110 for short-distance wireless communication, an antenna 111, a memory card 112 which is a removable medium. In operation, when a shutter (one of the operation buttons 106) is released, electrical charge stored in the image-capturing element 100 is converted into digital data by the A/D conversion section 101. The obtained digital data is converted into RGB data or YCrCb data in an image processing section 102, and thereafter, the data is compressed by the compression/decompression section 103. After a header section of the Exif/DCF (exchangeable image file format/design rule for camera file system) file format is added to the compressed data, the data is recorded in the memory card 112 via the memory card interface 109. When a captured image is to be displayed, the image data recorded in the memory card 112 is read via the memory card interface 109, decompressed by the compression/decompression section 103, and displayed on the LCD 104.

Figure 3:
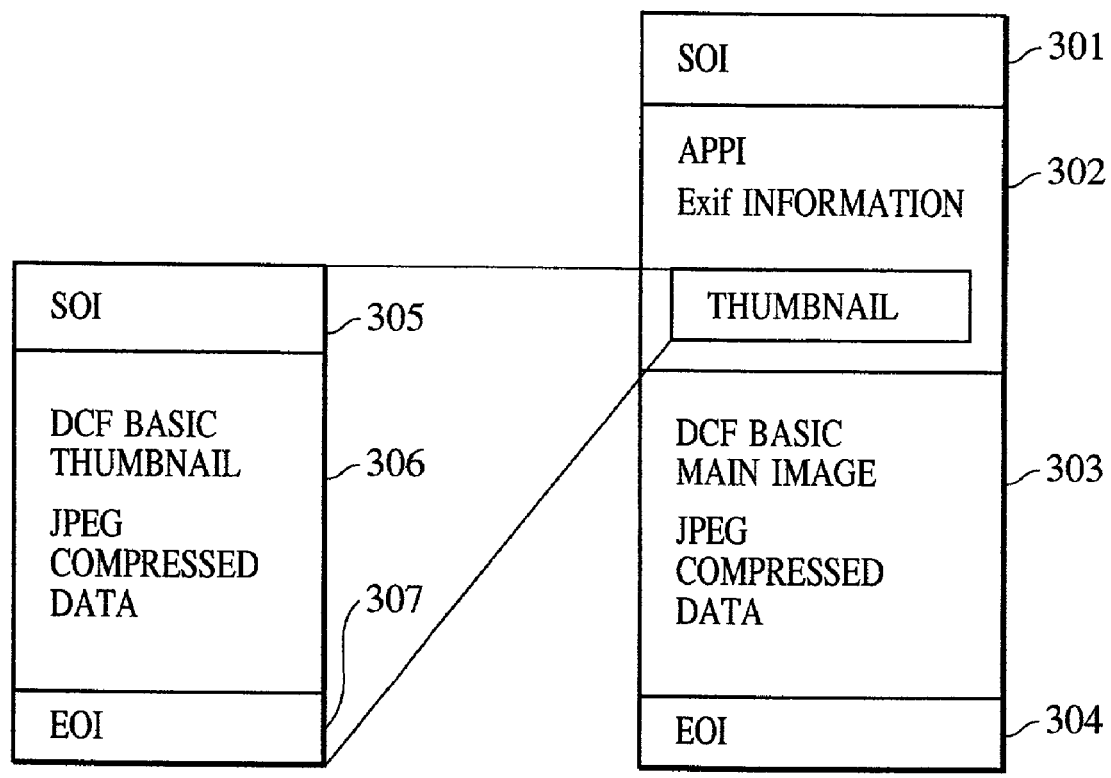
FIG. 3 shows the structure of an image file recorded on a removable medium.

FIG. 3 shows the structure of image data recorded in the memory card 112. Following a start marker 301 is an APP1 marker 302, where the information of the camera when the image was captured, GPS information (positional information), and a reduced image (thumbnail) of the image are stored. Next follows JPEG-compressed image data 303, and finally an EOI marker 304 which indicates the end of the image data of the file. The reduced image (thumbnail) stored in the APPI marker 302 is further formed of an SOI marker 305, JPEG-compressed data 306, and an EOI marker 307.

Figure 2:
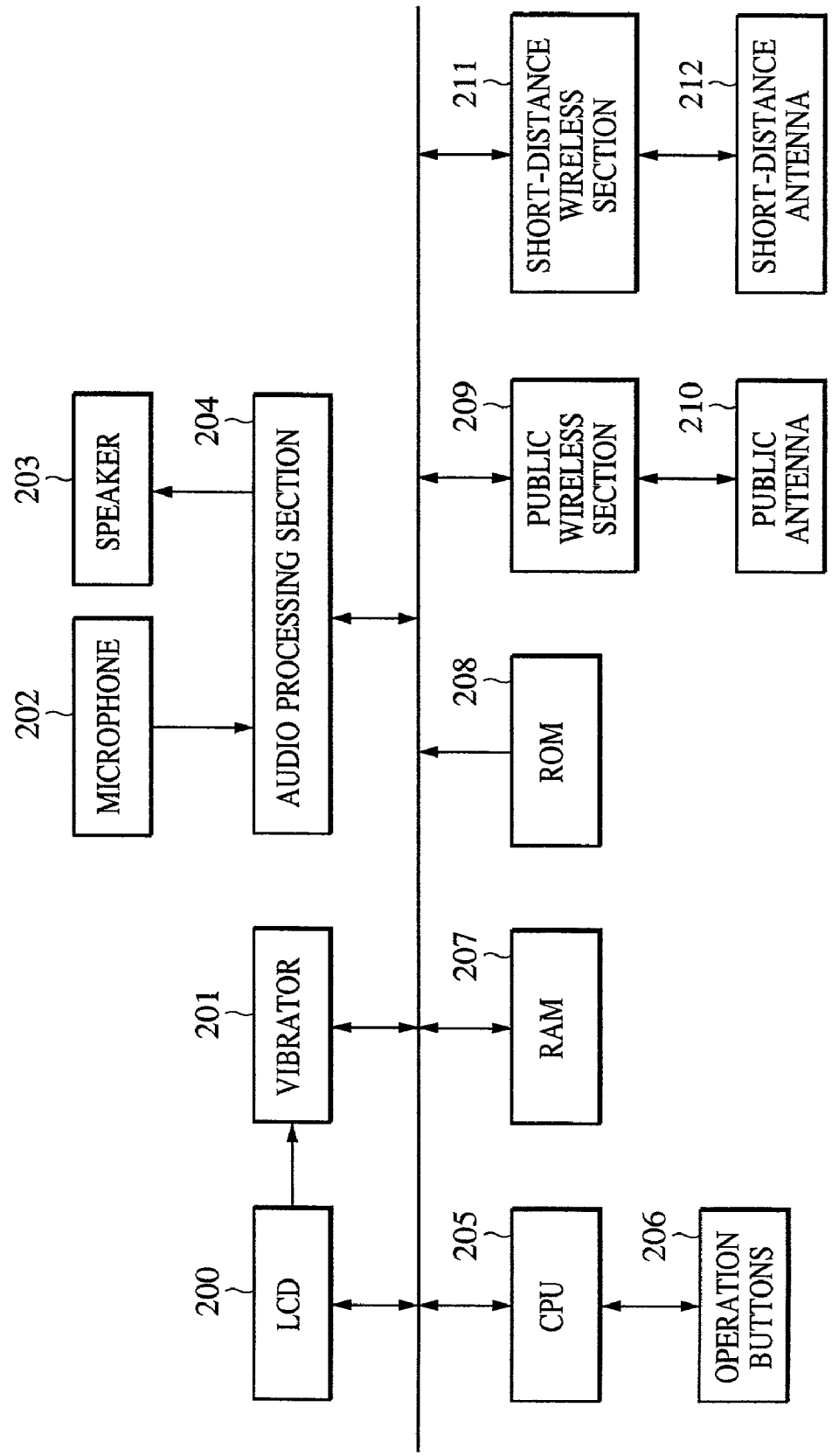
FIG. 2 shows the hardware configuration of a portable phone used in a print order recording system according to embodiments of the present invention.

FIG. 2 is a block diagram showing the hardware configuration of the portable phone 401 which is one component of the print order recording system. The portable phone 401 includes a display such as a liquid-crystal display 200, a vibrator 201, a microphone 202, a speaker 203, an audio processing section 204, a CPU (computer) 205, operation buttons 206, a RAM 207, a ROM 208, a public wireless section 209 for connection with a public network, and an antenna 210 for connection with the public network. Here, the "public network" refers to, for example, a digital portable phone network in which 900 MHz is used as the wireless frequency. The portable phone 401 further includes a short-distance wireless section 211 for wireless communication using short-distance wireless communication technology, and an antenna 212 for short-distance wireless communication. The "short-distance wireless communication technology" here refers to, for example, the "Bluetooth" technology in which, for example, 2.4 GHz ISM (Industrial Scientific Medical) band is used. The public wireless components 209 and 210, and the short-distance wireless components 211, 212 may be alternatively provided. Other wireless communication systems may also be used.

Figure 4:
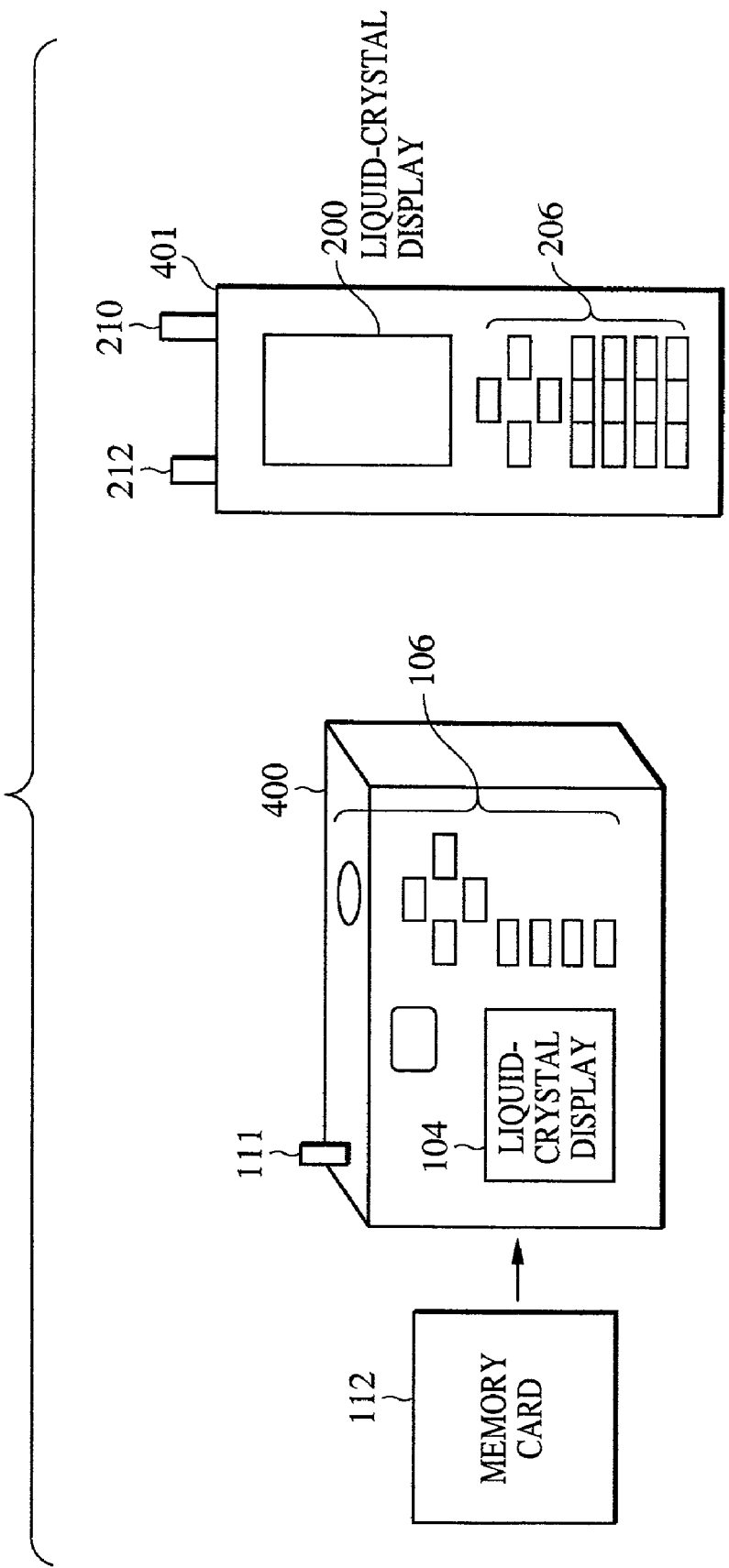
FIG. 4 illustrates a digital camera and a portable phone in a print order recording system according to embodiments of the present invention.

FIG. 4 shows the configuration of a print order recording system according to embodiments of the present invention, which includes a digital camera 400 and a portable phone 401. Certain components of the digital camera 400 and portable phone 401 shown in FIG. 4 are similar to those shown in FIGS. 1 and 2 are given the same reference numerals. The operation buttons 106 on the digital camera 400 may include a shutter button, a menu button, a set button, and a cross key. The operation buttons 206 on the portable phone 401 may include numeric keys, a menu key, and a cross key.

In all embodiments described below, the operations performed by the digital camera 400 and the portable phone 401 are under the control of the CPU 105 and the CPU 205, respectively. The CPU 105 operates in accordance with a program stored in the RAM 107. The RAM 107 is a storage medium in which the program for the CPU 105 is stored so as to be readable by the CPU 105. When the program for the CPU 105 is supplied from a floppy disk or a compact disk (not shown), this floppy disk or compact disk corresponds to a storage medium in which the program for the CPU 105 is stored so as to be readable by the CPU 105. Furthermore, the program for the CPU 105 may be externally supplied via the antenna 110. Similarly, the CPU 205 operates in accordance with a program stored in the RAM 207. The RAM 207 is a recording medium in which the program for the CPU 205 is stored so as to be readable by the CPU 205. When the program for the CPU 205 is supplied from a floppy disk or a compact disk (not shown), this floppy disk or compact disk corresponds to a recording medium in which the program for the CPU 205 is stored so as to be readable by the CPU 205. Furthermore, the program for the CPU 205 may be externally supplied from the antenna 210 or 212.

The operation performed by the portable phone 401 is described next. To begin the operation, the memory card 112 (removable medium) having photographed image data recorded thereon is inserted into the digital camera 400. For purpose of illustration, it is assumed that 50 pieces of image data from No. 1 to No. 50 are recorded. First, a user operates the operation buttons 206 on the portable phone 401 to select, from a menu displayed on the portable phone 401, a browsing operation to browse images stored in the digital camera 400. At this time, digital cameras which exist within a range connectable by short-distance wireless communication in the short-distance wireless section 211 are displayed on the LCD 200 of the portable phone. By operating the operation buttons 206, the user selects a desired digital camera 400 among the displayed cameras.

When image browsing of the digital camera 400 is selected, a reduced image of image No. 1 is displayed on the LCD 200. If the user wants to make a print order of the image being displayed, the user presses the print order specification button of the operation buttons 206. The display of the reduced image and the specification of the print order are repeated for all images (e.g., from No. 1 to No. 50) recorded in the memory card 112 or up to a desired image. When the specification of the print order is completed, a list of print-order-specified images (images for which print order is specified by the above-described operation) is displayed on the liquid-crystal device 200, and the print order information is confirmed.

Figure 5:
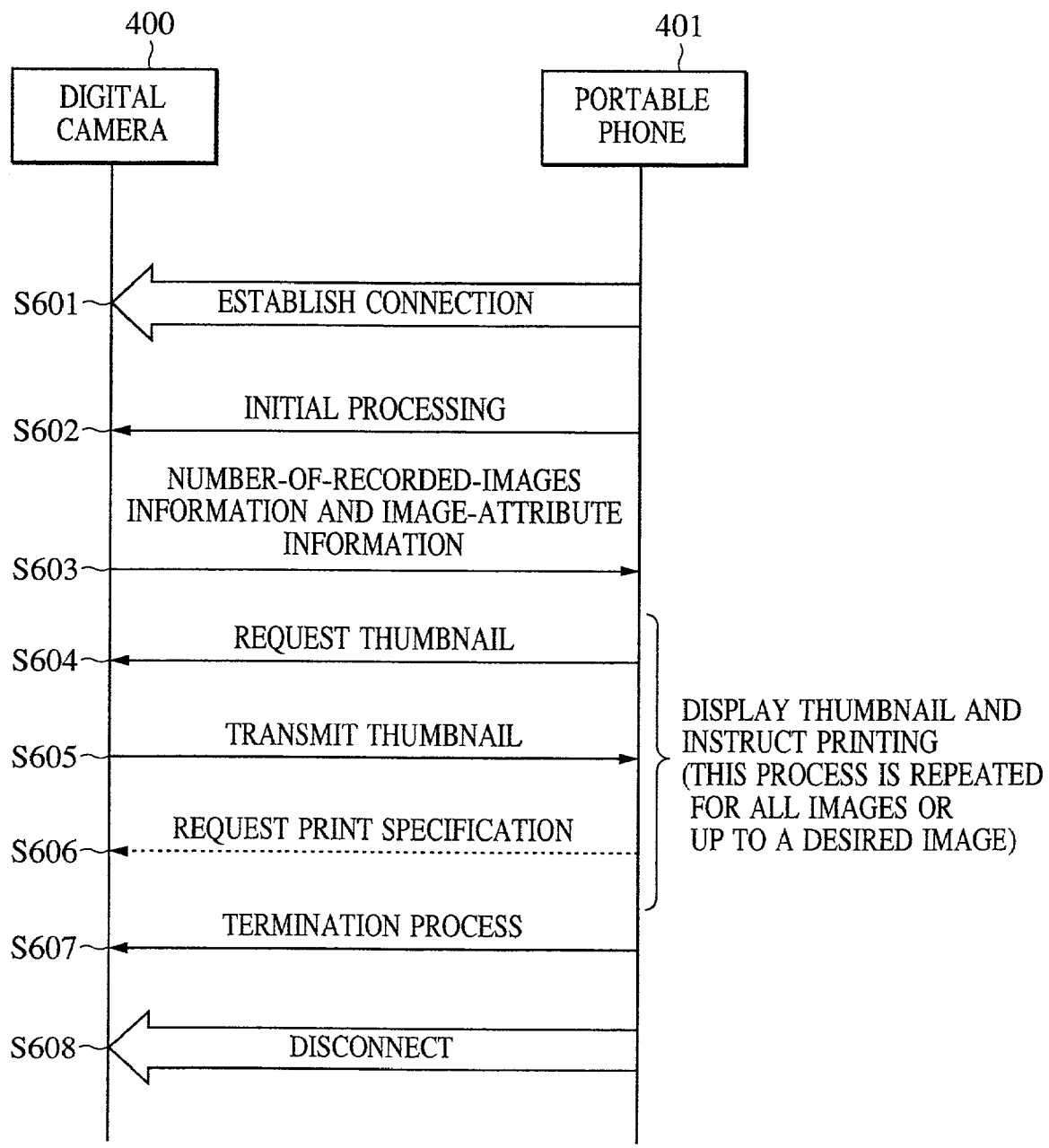
FIG. 5 is a message sequence diagram illustrating communication between a digital camera and a portable phone according to a first embodiment of the present invention.

FIG. 5 shows an example of a message sequence of short-distance wireless communication between the digital camera 400 and the portable phone 401. The left side in the figure represents the digital camera 400, and the right side represents the portable phone 401. The designations S601-S608 represent both the messages and the operation steps.

In step S601, the connection of short-distance wireless communication between the wireless section 110 of the digital camera 400 and the short-distance wireless section 211 of the portable phone 401 is established. At this time, the connection from the physical layer to the transport layer is established. In Bluetooth, this corresponds to communication at OBEX (ObjectExchange) being established. The portable phone 401 then allocates and initializes the memory area of the RAM 207 necessary for this process, and makes a request to the digital camera 400 for information regarding the number of pieces of image data recorded in the memory card 112 and image attribute information such as the size of the reduced image data (S602). The information regarding the number of recorded images and image attribute information are transmitted from the digital camera 400 to the portable phone 401 (S603). For purpose of illustration, it is assumed that 50 images are stored. Furthermore, the telephone number of the portable phone 401 and the name of the registered user are reported to the digital camera 400. A request of transmitting reduced image data of image No. 1 is sent from the portable phone 401 to the digital camera 400 (S604), and the reduced image data of image No. 1 is sent from the digital camera 400 to the portable phone 401 (S605). The portable phone 401 displays the received reduced image of image No. 1 on the LCD 200. If the user wants to print the image, the user presses the print order specification button which is one of the operation buttons 206. When print order specification (also referred to as print order creation instruction) is specified, the print order specification information specified by the operation buttons 206 is converted into a print order creation request (print specification request), and the print order creation request is transmitted as a request via the short-distance wireless section 211 of the portable phone 401 to the digital camera 400 (S606). When the print specification instruction is not specified, a selection of whether or not the print instruction operation should be terminated is made. The operation buttons 206 allows the user to input a request for the next reduced image or to input the termination of the print instruction, or to request the retransmission of the previous reduced image. Steps S604 to S606 are repeated as necessary to process subsequent images. Since the number of pieces of image data recorded in the memory card 112 has been received in step S603, when a request for the next reduced image is input after all the reduced images have been received, a request of the retransmission of the first reduced image is made to the digital camera 400. In this manner, the transmission of the reduced image data and the transmission of the print order information are alternately performed.

When the print instruction operation is to be terminated, the image for which a print request was made is confirmed, and the termination of the print instruction operation is reported to the digital camera 400 (S607). The connection of the transport layer and lower layers is then disconnected (S608).

Figure 6:
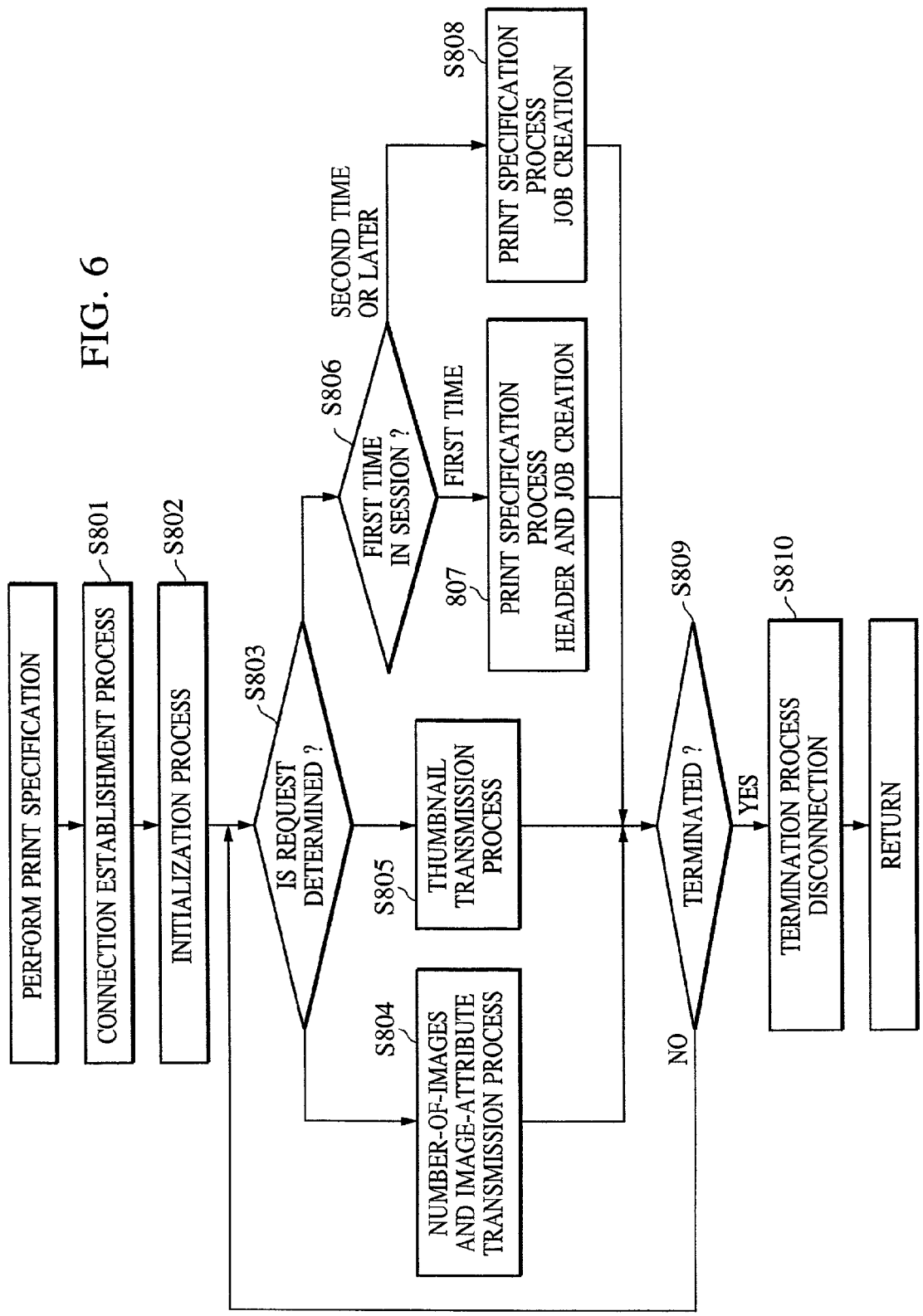
FIG. 6 is a flowchart showing processes of the digital camera according to the first embodiment of the present invention.

FIG. 6 shows a flowchart of processes in the digital camera 400. In step S801, a call origination from the portable phone 401 is received by the wireless section 110, and a process of establishing a connection of the transport layer and lower layers is performed. In the case of the short-distance wireless communication technology "Bluetooth", this corresponds to the establishment of the connection up to the OBEX layer.

An initialization process, including the memory initialization of the RAM 107, is performed (step S802). The contents of the request transmitted from the portable phone 401 are checked (step S803). In the case of a number-of-images/image-attribute transmission process request, the process proceeds to step S804. In the case of a reduced-image-data transmission request, the process proceeds to step S805. In the case of a print order creation request, the process proceeds to step S806. In step S804, the number of images, stored in the memory card 112, and image attribute information are transmitted from the wireless section 110 to the portable phone 401. At the same time, the telephone number of the portable phone 401 and the name of the user are received as necessary. In step S805, the reduced image data of the image recorded in the memory card 112 is transmitted to the portable phone 401. The reduced image of image No. 1, No. 2, etc. are sequentially.

In step S806, it is determined whether the print order request from the portable phone 401 is a first request in this session (from when the connection is established in step S801 until the connection is disconnected in step S810) or a subsequent request. In the case of a first request, the process proceeds to step S807, and in the case of a subsequent request, the process proceeds to step S808. In step S807, print order information is created in the RAM 107. Since this is the first print order, the information common to the order is created in the header section, and a job is created with respect to the image for which a print order is made for the first time. In one embodiment, a print order file is written into the memory card 112 at this point in time. The information of the header section contains the identification information (the telephone number, and the name) of the user of the portable phone 401, who is a print requesting person, and the job contains information, such as the identification information (the filename) of the image to be printed, the print format, and the number of copies. The identification information of the user of the portable phone 401 is reported from the portable phone 401 in step S603 in FIG. 5. In step S808, the print order information which has already been created in the RAM 107 is updated. The update is an addition of a job to the image for which a print order is made in a subsequent time. In the embodiment in which the print order file is written into the memory card 112 in step S807, the print order file in the memory card 112 is updated at this point in time.

In step S809, if there is a disconnection request from the portable phone 401, the process proceeds to step S810, and, otherwise, the process proceeds to step S803. In step S810, a process of disconnecting the transport layer or lower layers is performed. In an embodiment in which writing into the print order file in the memory card 112 is not performed in steps S807 and S808, the print order information is written into the print order file of the memory card 112 at the timing of step S810.

FIG. 7 shows an example of the print order file which is created and updated in step S806. The example conforms to the standard of DPOF (Digital Print Order Format). The print order file is divided into a header section [HDR] and one or more job section [JOB]. The identification information, such as the telephone number and the name of the user, of the print requesting person, received from the portable phone 401, is written in the header section. This identification information in the print requesting person is reported from the portable phone 401 in step S603 in FIG. 6. In the job section, the format for each image to be printed, the number of copies, the path name of the file in which images are stored within the memory card 112, are written. The information in the job section is information transmitted in step S606. In the print order file of FIG. 7, a HDR section and a first job (collectively, 901) are created in the process of step S807 of the first time of a session. In a subsequent step S808, a subsequent job section 902 is created, and only the job section is added. Although only the second job section 902 is shown in FIG. 7, when a third or later job section is created, the created job section is added similarly to the job section 902.

As described above, embodiments of the present invention enables a user to make a print order by using, in addition to the digital camera 400, a portable phone 401 located within a short distance from it. Furthermore, since the reduced image data of the original image is received one by one from the digital camera 400 and printing is instructed as necessary, the image memory (the RAM 207 in FIG. 2) area for the portable phone 401 is only required to have a size sufficient to store one piece of reduced image data.

In an alternative embodiment, instead of sending 50 pieces of image data from No. 1 to No. 50 one by one, multiple pieces of image data may be sent in response to one request. For example, 10 pieces from No. 1 to No. 10 may be sent at first. When there is a next request, 10 pieces from No. 11 to No. 20 are sent, etc.

Next, a second embodiment of the present invention will be described. In the second embodiment, at the initial step of the print order creation process, all the reduced image data of the recorded images is transferred from the digital camera (print order recording apparatus) 400 to the portable phone (communication device) 401. Thereafter, the connection is disconnected temporarily, and a print order specification operation is performed by the portable phone 401 alone. When the print order specification operation is terminated, the connection is established once more, and the print order information is transmitted from the portable phone 401 to the digital camera 400. The digital camera 400 receiving the print order information records the information, as a print order file, in the memory card 112. For this embodiment, the hardware configuration of the digital camera and the portable phone, the format of image data recorded in the memory card, and the general structure of the digital camera and the portable phone are similar to or the same as those of the first embodiment, and accordingly, descriptions thereof are omitted here.

To begin the operation according to the second embodiment, the memory card 112 (removable medium) having captured image data recorded thereon is inserted into the digital camera 400. For purpose of illustration, it is assumed that 50 pieces of image data from No. 1 to No. 50 are recorded. Initially, an operator selects the image browsing menu of the digital camera 400 from the menu displayed on the portable phone 401. Here, devices which exist within an area which can be reached by the short-distance wireless communication technology are displayed in a list, and the operator selects a target device from among the devices. Thereafter, reduced image data is transmitted from the digital camera 400 to the portable phone 401. After all the reduced image data is received by the short-distance wireless section 211, the operation can be stopped temporarily.

An image selection operation is then performed in the portable phone 401. First, the reduced image of image No. 1 is displayed on the liquid-crystal device 200. Then, if the operator wants to print the image being displayed, the operator presses the print order specification button of the operation buttons 206. This is repeated for all the images or up to a desired image. When the selection operation is terminated, the print-order-specified image is confirmed, and the operation is terminated.

Transmission of print order information from the portable phone 401 to the digital camera 400 is performed next. After the image selection operation is terminated, when the digital camera 400 and the portable phone 401 are at a position at which short-distance wireless communication is possible, a print order transmission process is started, the digital camera of the transmission destination is selected, and the print order is transmitted from the short-distance wireless section 211 to the digital camera 400.

Figure 8:
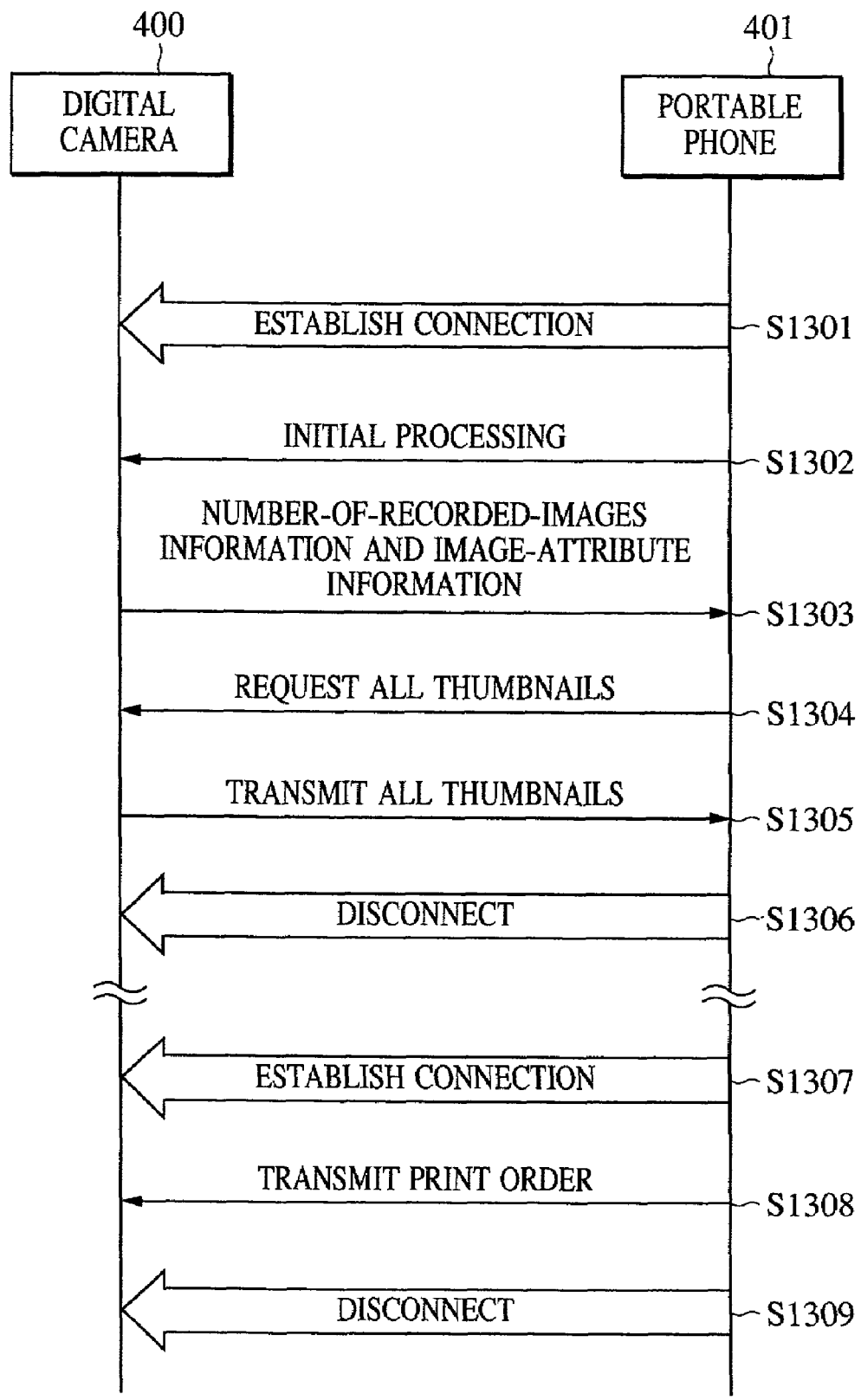
FIG. 8 is a message sequence diagram illustrating communication between a portable phone and a digital camera according to a second embodiment of the present invention.

FIG. 8 shows an example of a message sequence of short-distance wireless communication between the digital camera 400 and the portable phone 401 in the second embodiment. The left side in the figure represents the digital camera 400, and the right side represents the portable phone 401. The designations S1301-S1309 represent both the messages and the operation steps. In step S1301, the connection of short-distance wireless communication between the short-distance wireless section 211 and the wireless section 110 is established. At this point in time, the connection from the physical layer to the transport layer is established. In Bluetooth, this corresponds to communication at OBEX (ObjectExchange) being established. The portable phone 401 then allocates and initializes the memory area of the RAM 207 necessary for this process, and makes a request via the short-distance wireless section 211 to the digital camera 400 for information regarding the number of pieces of recorded image data and image attribute information such as the size of the reduced image data (S1302). The information regarding the number of recorded images and the attribute information of the images are transmitted from the wireless section 110 of the digital camera 400 to the portable phone 401 (S1303). For purpose of illustration, it is assumed that 50 images are stored. Furthermore, the telephone number of the portable phone 401 and the name of the registered user are reported to the digital camera 400 via the short-distance wireless section 211. Then, based on the number of images obtained from the digital camera 400, a request of transmitting the reduced image data of all the images is sent from the short-distance wireless section 211 of the portable phone 401 to the digital camera 400 (S1304), and the reduced image data of all the images is transmitted from the wireless section 110 of the digital camera 400 to the portable phone 401 (S1305). After this transmission, the connection of the transport layer and lower layers between the short-distance wireless section 211 and the wireless section 110 is disconnected temporarily (S1306), before it is re-established (S1307). Then, the print order information is transmitted from the short-distance wireless section 211 of the portable phone 401 to the digital camera 400 (S1308). The print order information sent herein includes (see FIG. 7), for example, the name of the portable phone user who made an order, the telephone number, the path of the image to be print-ordered, the number of copies, the print format, the presence or absence of date information which is printed together with the image. After the print order information is transmitted, the connection of the transport layer and lower layers between the short-distance wireless section 211 and the wireless section 110 is disconnected (S1309).

A more detailed description is given for the process of specifying a print order in the portable phone 401, performed after the portable phone receives the reduced image data from the digital camera 400 and during the period when the connection is temporarily disconnected. First, one or more reduced images received via the short-distance wireless section 211 are displayed on the liquid-crystal device 200. If an image which is desired to be printed from the displayed reduced images is specified by operating the operation buttons 206, the image specification information inputted from the operation buttons 206 is converted into print order information so as to create the print order information. If an image is not desired to be printed and the print order process is to be continued, the display of the thumbnail and the specification of the image desired to be printed are repeated. If an image is not desired to be printed and the print order process is to be terminated, the connection of the transport layer and lower layers between the short-distance wireless section 211 and the wireless section 110 is established. The print order information which was previously created is converted into a print order creation request, and this request is transmitted as a request via the short-distance wireless section 211 to the digital camera 400, and the connection is disconnected.

For this embodiment, the process performed within the digital camera 400 is similar to that of the first embodiment shown in the flowchart in FIG. 6, with the following differences. First, in a step corresponding to step S805 of FIG. 6, the reduced image data of all the images is transmitted from the wireless section 110 to the portable phone 401. Second, since the print order information has already been formed into one cluster in the portable phone, there is no determination as to whether or not the print order information is a first one, i.e. there is no step corresponding to step S806. When it is determined in a step corresponding to step S803 that the print order information is received, the digital camera 400 writes the information as a print order file into the memory card 112.

In the second embodiment, since all the reduced images are sent to the portable phone 401 in advance and, thereafter, the session is disconnected temporarily, it is not necessary to perform a print instruction operation on the portable phone 401 in the vicinity of the digital camera 400, and it becomes possible to carry only the portable phone 401 and to perform an operation at a desired time. However, it may occur that the removable medium of the digital camera 400 has been replaced with another one by the time the print order information created by the portable phone is transmitted, or a portion of the image data is deleted even though the removable medium is not replaced.

In a third embodiment of the present invention, when the digital camera 400 receives the print order information, a confirmation is made as to whether or not the print order information matches the image within the removable memory card 112.

Figure 9:
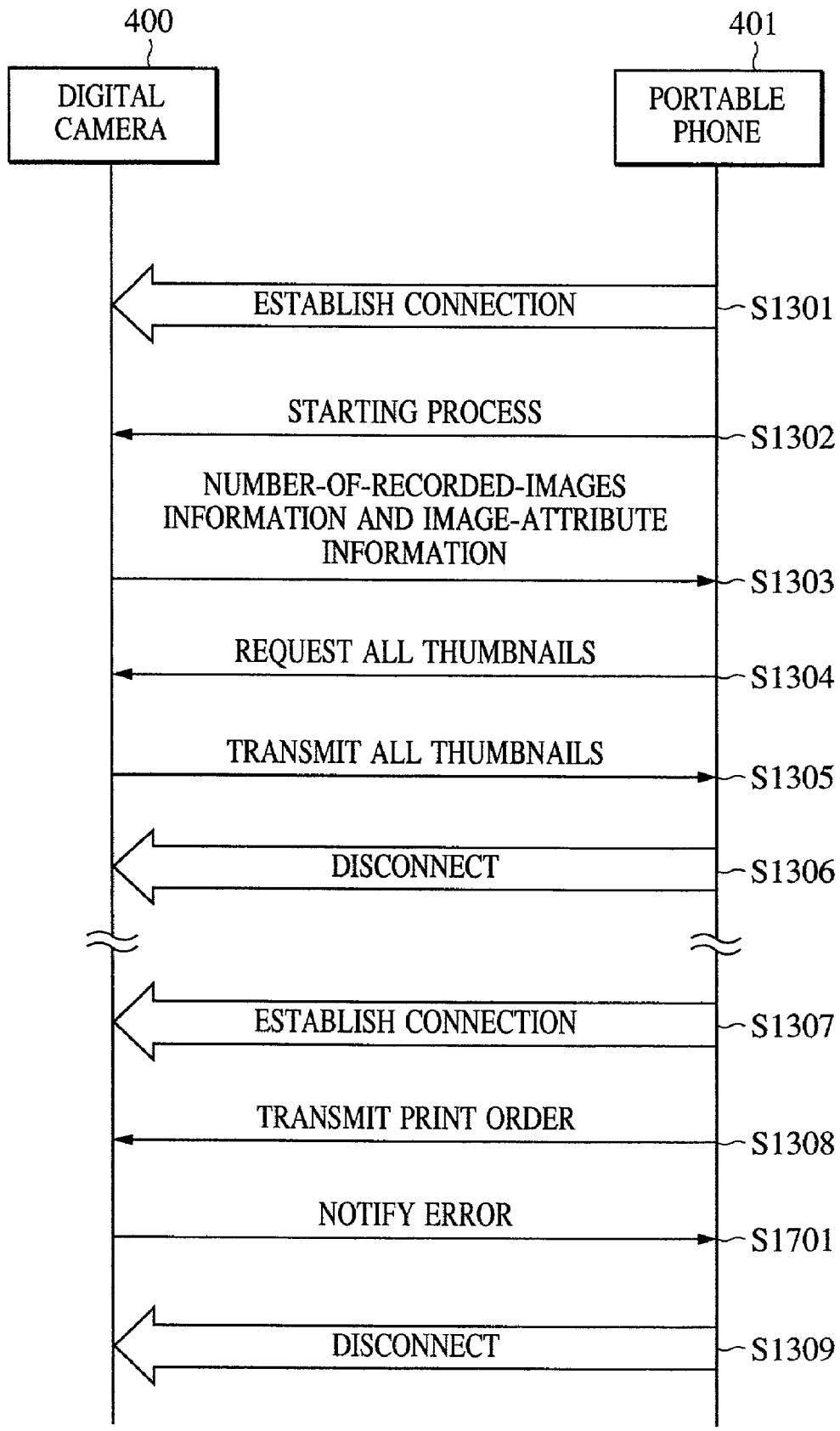
FIG. 9 is a message sequence diagram illustrating communication between a portable phone and a digital camera according to a third embodiment of the present invention.

FIG. 9 shows an example of a message sequence in a third embodiment of the present invention, which is identical to the sequence of the second embodiment shown in FIG. 8, except that a message S1701 is added. Here, the digital camera 400 receiving the print order information in message S1308 returns error information in message S1701. Types of errors include the changing of a removable medium and the non-existence of an image included in the print order. According to this embodiment, the digital camera 400 performs an error handling process. When the digital camera 400 determines (in a step corresponding to step S803 shown in FIG. 6) that the print order information is received, a process shown in the flowchart in FIG. 10 is performed before the print order information is written as a print order file into the memory card 112.

Figure 10:
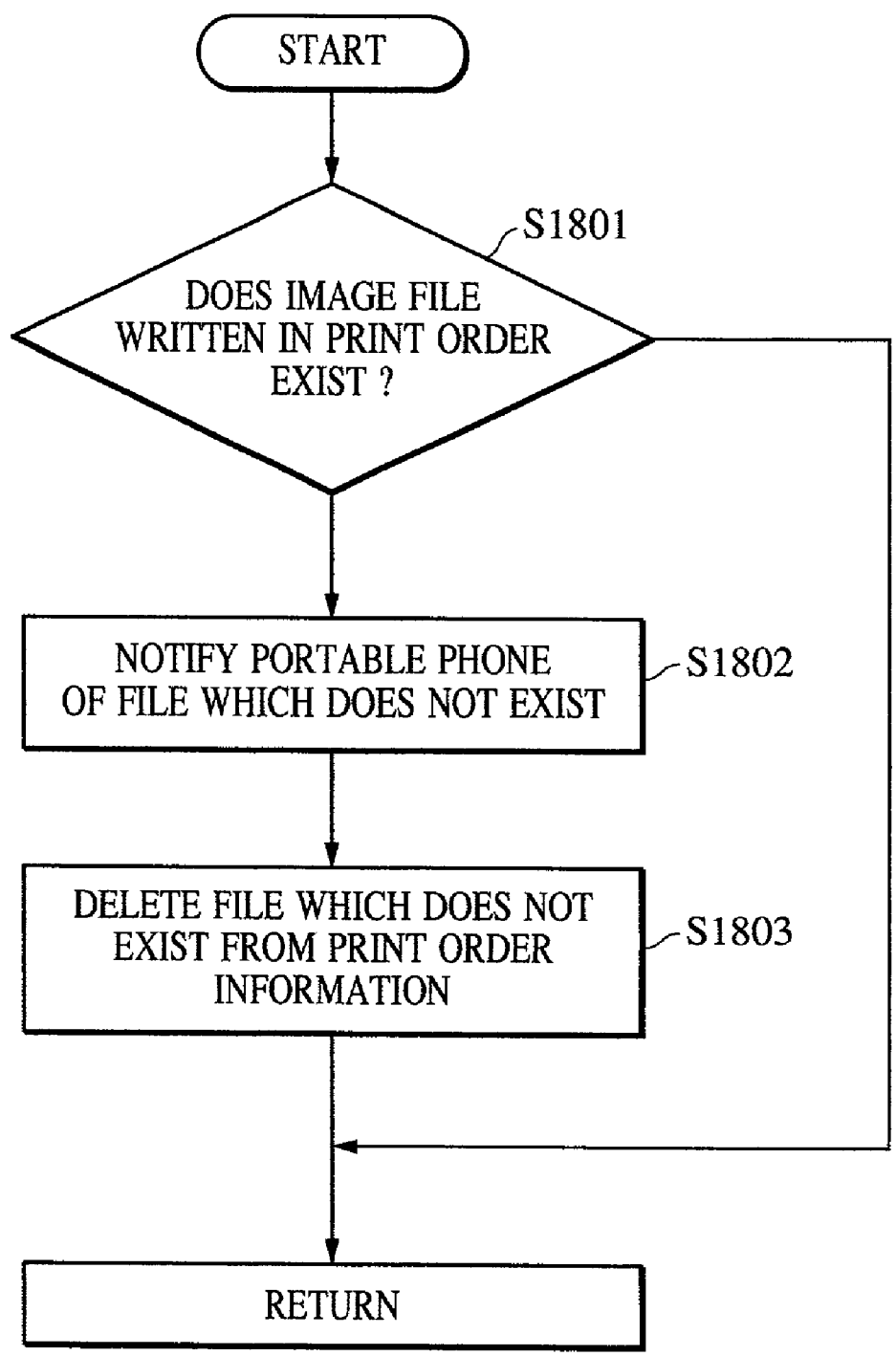
FIG. 10 is a flowchart showing processes of the digital camera according to the third embodiment of the present invention.

As shown in FIG. 10, in step S1801, it is confirmed whether or not the image file written in the print order information exists in the memory card 112. When the memory card itself is changed or when a portion of the image written in the print order information does not exist, the process proceeds to step S1802. When, on the other hand, the print order information matches the image, control exits from this flow, and the print order file is written into the memory card 112. In step S1802, the filename of the image which does not exist or the fact that a different removable medium is inserted is returned as an error to the portable phone 401 via the wireless section 110. In step S1803, the file which does not exist is deleted from the print order information, and control exits from this flow. When a portion of the image written in the print order information exists, the print order file for which the printing of the image of that portion is requested is written into the memory card 112.

According to this embodiment, when the print order is started, if the image data within the memory card 112 of the digital camera 400 has been deleted or the removable medium has been replaced, mismatching with the print order is reported to the user (portable phone 401), and only the images that exist are printed.

In another alternative embodiment, if the print order file contains even one file that does not exist in the memory card 112, the writing of the print order file is not performed.

The above embodiments allow multiple users to use their portable phones to make a print order.

Figure 11:
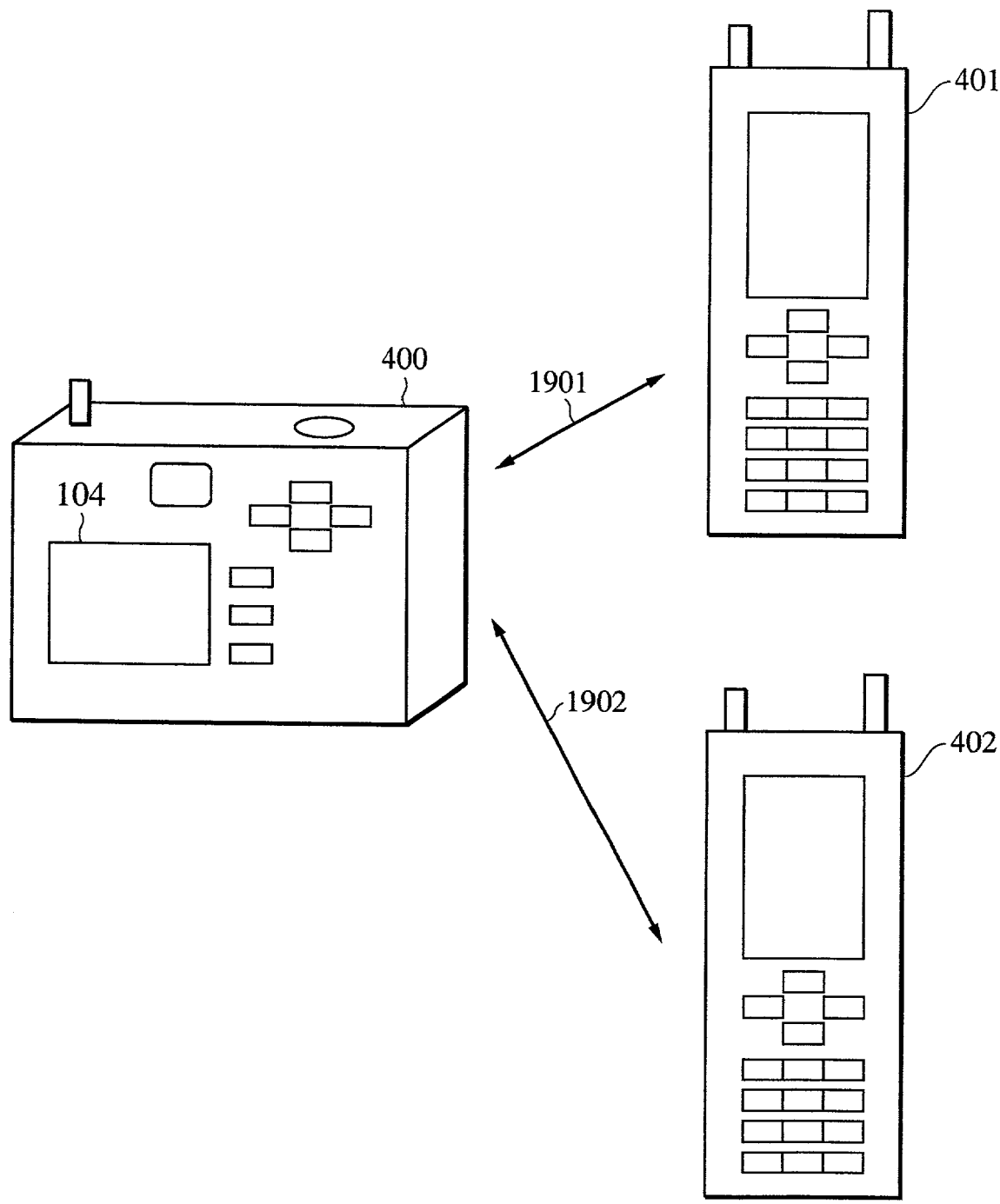
FIG. 11 illustrates a digital camera and two portable phones according to another embodiment of the present invention.

In a fourth embodiment of the present invention shown in FIG. 11, two portable phones 401 and 402 are connected to a digital camera 400 via connections 1901 and 1902 at the same time, and print order information from each portable phone is received by the digital camera, and the print order information is written into a print order file in the memory card of the digital camera 400. Although two portable phones are shown, more than two portable phones may be connected to the digital camera 400. The message sequence of each of the connections 1901 and 1902 is the same as that of the first embodiment shown in FIG. 5, and the processes performed by the portable phones 401 and 402 are the same as those of the first embodiment. Within the digital camera 400, one independent process is performed for each of the connections 1901 and 1902, and the flowchart of each process is the same as that of the first embodiment shown in FIG. 6.

As a result, in the digital camera 400, two print order files are created. Since the name of the user of each of the portable phones 401 and 402 and the telephone number are contained in the header information of each print order file, it is possible to identify which user the print order file is for. A different filename of the print order file id preferably used, such as AUTPRINT1.MRK or AUTPRINT2.MRK, for each process so as to distinguish the files. This embodiment enables a plurality of users to make print orders with respect to the image file recorded in the same memory card.

In a fifth embodiment of the present invention, a plurality of users use their portable phones to make print orders (see FIG. 11). The processes with respect to each portable phone are similar to those in the second embodiment, in which all the reduced image files are transmitted to the portable phone in advance, and the session is disconnected temporarily. Thereafter, the print order is transmitted from the portable phone after the print instruction process is completed. The message sequence of each of the connections 1901 and 1902 is the same as that of the second embodiment shown in FIG. 8, and processes performed by the portable phones 401 and 402 are the same as those of the second embodiment. Within the digital camera 400, one independent process is performed for each of the connections 1901 and 1902, and the flowchart of each process is the same as that of the second embodiment.

As a result, in the digital camera 400, two print order files are created. Since the name of the user of each of the portable phone 401 and 402 and the telephone number are contained in the header information of each print order file, it is possible to identify which user the print order file is for. Again, different filenames are preferably used to distinguish the files.

This embodiment enables a plurality of users to make print orders with respect to the image file recorded in the same memory card. Furthermore, after the reduced image is received at the portable phone, it is possible to move away from the digital camera.

Figure 12:
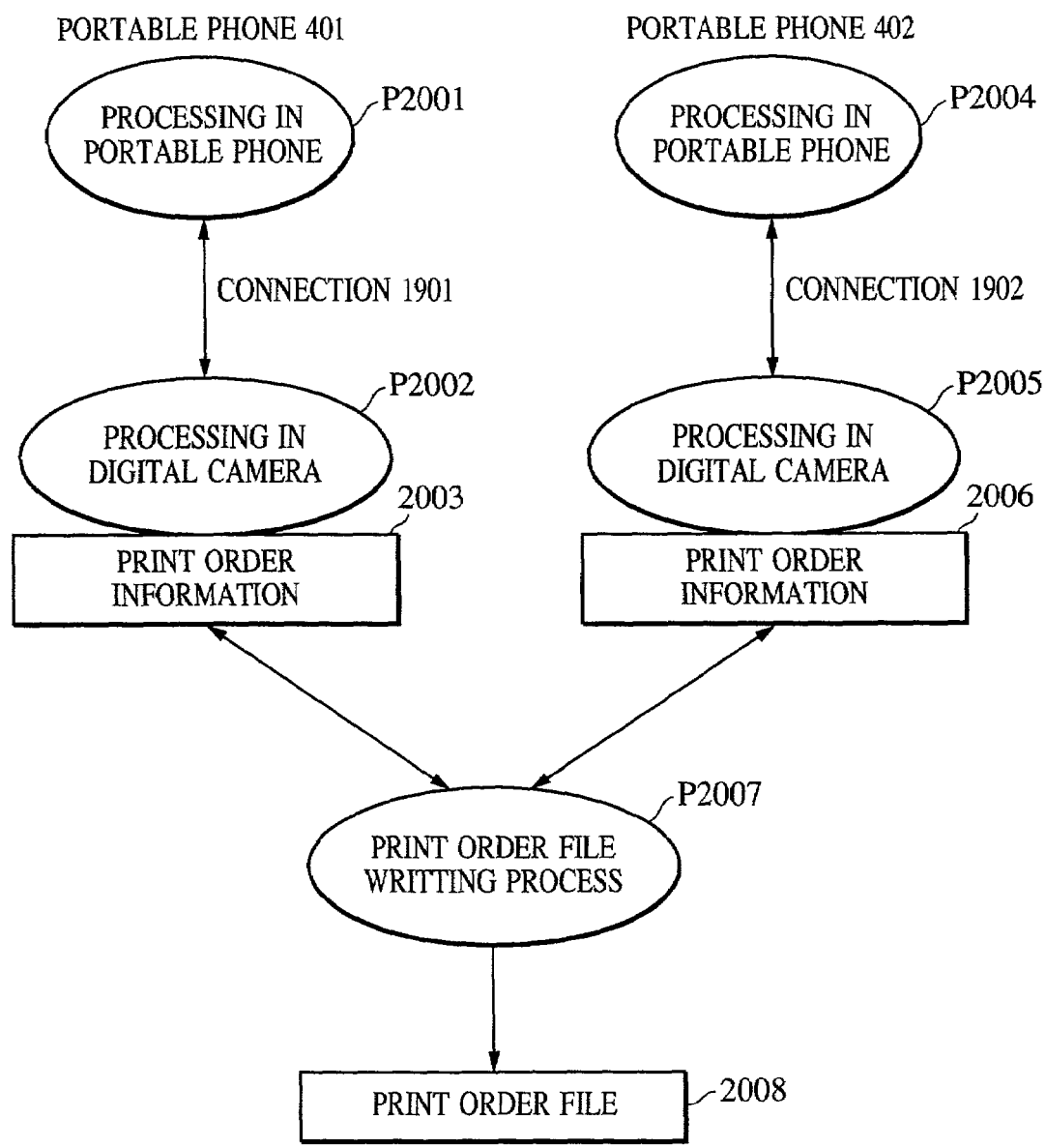
FIG. 12 is a process diagram in a digital camera and a portable phone according to the embodiment of FIG. 11.

In the fourth and fifth embodiments described above, a plurality of print order files are created corresponding to the plurality of portable phones. In a sixth embodiment, print order information from a plurality of portable phones 401 and 402 is converted into one print order file within the digital camera 400 and is recorded. FIG. 12 is a process diagram for creating one print order file (for example, AUTPRINT.MRK) 2008 in the digital camera 400 on the basis of print order information 2003 and 2006 received from the plurality of portable phone 401 and 402. In FIG. 12, P2001 and P2004 indicate processes performed by the portable phones 401 and 402, respectively. These processes may be those described in the first or second embodiment. P2002 and P2005 indicate two processes performed by the digital camera 400. These processes may be those described in the first or second embodiment (for example, that shown in the flowchart in FIG. 6).

Then, print order information 2003 and 2006 created in the above processes from information received from the portable phone 401 and 402 are stored in the RAM 107. A process P2007 which can access memories managed by these two processes at the same time is then performed as follows. First, the header information of the print order information 2003 is read, and the header information of the print order information 2006 is read. This header information contains the name of the user of the portable phones 401 and 402 and the telephone numbers, respectively. Then, the header section of the print order file 2008 is created. In this header section, the device name of the digital camera 400, the name of the owner, the creation date of the print order file 2008, etc., are written. Thereafter, the job information of the print order information 2003 is read. This job information contains the filename of the image specified by the portable phone 401, the number of copied to be printed, and the print format. Then, the job section of the print order file 2008 is created. In this job section, in addition to the job information of the print order information 2003, the information of the header section of the previously read print order information 2003 is written using a vendor unique tag. The name of the user and the telephone number contained in the header of the print order information 2003 are written in the job section of the print order file 2008. Similarly, a job is read from the job section of the print order information 2006, and the job is written into the job section of the print order file 2008. The header information of the previously read print order information 2006 is also written into the job section of the print order file 2008 using the vendor unique tag. The name of the user and the telephone number contained in the header of the print order information 2006 are written in the job section of the print order file 2008. Then, the print order file 2008 containing the header section and the job section created in the above described manner is written into the memory card 112. As a result, a print order file 2008 (with a filename such as AUTPRINT.MRK) conforming to the specification of the current DPOF is created.

Further, an existing print order file (e.g. 2008) stored in the memory card 112 can be updated with additional print order information (e.g. 2006) received from a portable phone (e.g. 402). The existing print order file already includes a header section containing the device name of the digital camera 400, the name of the owner, the creation date of the print order file 20008, etc., and a job section containing job information from a previous print order information (e.g. 2003) as well as information from the header section of the print order information 2003 written with a vendor unique tag. When updating the print order file 2008, the digital camera 400 writes the job section of the print order information 2006 as a new job section of the print order file 2008, and writes the header information of the print order information 2006 into the new job section of the file 2008 with a vendor unique tag.

Embodiments of the present invention have been described in detail above. Aspects of the invention includes the hardware configuration of the print order recording system and its components, as well as the processes performed by the system and the various components, and computer program product for controlling these processes.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A print order recording apparatus comprising:
   means for reading from and writing to a removable medium; and
   a communication section for receiving from a communication device print order information, and for sending to the communication device a first image identification, which is an identification of any image which is included in the print order information but does not exist in the removable medium,
wherein said means for reading from and writing to the removable medium record in the removable medium a second image identification, which is an identification of an image which is included in the print order information and exists in the removable medium.

2. A print order recording apparatus according to claim 1, wherein the print order information further specifies the number of prints and a print format for each image to be printed.

3. A print order recording apparatus according to claim 1, wherein said said means for reading from and writing to the removable medium record in the removable medium the second image identification and information relating to the communication device.

4. A print order recording apparatus according to claim 1, wherein said communication section transmits data concerning images stored in the removable medium to the communication device.

5. A print order recording apparatus according to claim 1, wherein said communication section transmits reduced image data representing one or more original images stored in the removable medium to the communication device.

6. A print order recording apparatus according to claim 1, wherein said communication section communicates with the communication device via wireless communication.

7. A print order recording apparatus according to claim 1, wherein the print order recording apparatus is selected from the group consisting of a digital camera, a printer and a personal digital assistant, and the communication device is selected from a group consisting of a portable phone, a digital camera and a personal digital assistant.

8. A computer usable medium embedding a print order recording program, said program comprising program code configured to cause a print order recording apparatus to perform the steps of:
receiving from a communication device print order information;
identifying any image that is included in the print order information but that does not exist in a removable medium storing at least one image;
sending to the communication device a first image identification, which is an identification of the image which is included in the print order information but does not exist in the removable medium; and
recording in the removable medium a second image identification, which is an identification of an image which is included in the print order information and exists in the removable medium.

9. A computer usable medium according to claim 8, wherein the print order information further specifies the number of prints and a print format for each image to be printed.

10. A computer usable medium according to claim 8, wherein said recording step includes recording in the removable medium the second image identification and identification information relating to the communication device.

11. A computer usable medium according to claim 8, wherein the program code further causes the print order recording apparatus to transmit data concerning images stored in the removable medium to the communication device.

12. A computer usable medium according to claim 8, wherein the program code further causes the print order recording apparatus to transmit reduced image data representing one or more original images stored in the removable medium to the communication device.

13. A method used in a print order recording apparatus capable of communicating with a communication device, the method comprising the steps of:
receiving from the communication device print order including an identification of an image to be printed;
identifying any image that is included in the print order information but that does not exist in a removable medium storing at least one image;
sending to the communication device a first image identification, which is an identification of the image which is included in the print order information but does not exist in a removable medium; and
recording in the removable medium a second image identification, which is an identification of an image which is included in the print order information and exists in the removable medium.

14. A method according to claim 13, wherein the print order information further specifies the number of prints and a print format for each image to be printed.

15. A method according to claim 13, wherein said recording step includes recording in the removable medium the second image identification and identification information relating to the communication device.

16. A method according to claim 13, further comprising the step of transmitting data concerning images stored in the removable medium to the communication device.

17. A method according to claim 13, further comprising the step of transmitting reduced image data representing one or more original images stored in the removable medium to the communication device.

* * * * *